(12) United States Patent
Dabiri

(10) Patent No.: US 8,416,719 B2
(45) Date of Patent: *Apr. 9, 2013

(54) GENERATING AN ESTIMATED NON-LINEAR ECHO SIGNAL

(75) Inventor: Dariush Dabiri, San Jose, CA (US)

(73) Assignee: Aquantia Corporation, Milpitas, CA (US)

(*) Notice: Subject to any disclaimer, the term of this patent is extended or adjusted under 35 U.S.C. 154(b) by 1420 days.

This patent is subject to a terminal disclaimer.

(21) Appl. No.: 12/077,672

(22) Filed: Mar. 20, 2008

(65) Prior Publication Data

US 2009/0238102 A1 Sep. 24, 2009

(51) Int. Cl.
*H04B 3/20* (2006.01)

(52) U.S. Cl.
USPC .......................................... 370/286; 370/282

(58) Field of Classification Search .................. 370/282, 370/286

See application file for complete search history.

(56) References Cited

U.S. PATENT DOCUMENTS

| 6,856,191 | B2 | 2/2005 | Bartuni | |
|---|---|---|---|---|
| 6,934,387 | B1 | 8/2005 | Kim | |
| 6,946,983 | B2 | 9/2005 | Andersson et al. | |
| 2005/0207346 | A1* | 9/2005 | Chu et al. | 370/241 |
| 2005/0243946 | A1* | 11/2005 | Chung et al. | 375/297 |
| 2007/0190952 | A1* | 8/2007 | Waheed et al. | 455/114.3 |
| 2007/0211794 | A1 | 9/2007 | Dabiri et al. | |
| 2007/0260455 | A1* | 11/2007 | Akamine et al. | 704/233 |
| 2009/0222226 | A1* | 9/2009 | Baraniuk et al. | 702/66 |

* cited by examiner

*Primary Examiner* — Asad M Nawaz
*Assistant Examiner* — Najeebuddin Ansari
(74) *Attorney, Agent, or Firm* — Mahamedi Paradice Kreisman LLP; Lance M. Kreisman

(57) ABSTRACT

Embodiments of a method and apparatus for generating an estimated non-linear echo signal are disclosed. One method includes receiving a plurality of data inputs. The plurality of data inputs are partitioned into subsets. A weight vector is computed for each of the subsets. A vector of addresses to memory locations is computed for each of the subsets. Values of interpolants are accessed at the memory locations (interpolation sites) based on the vector of addresses for each of the subsets. The estimated non-linear echo signal based is calculated on the values of the interpolants and the weight vector corresponding to each subset.

20 Claims, 11 Drawing Sheets

GENERATING AN ESTIMATED NON-LINEAR ECHO SIGNAL

RELATED APPLICATIONS

This application is related to U.S. patent application Ser. No. 11/373,928, titled "Transceiver Non-Linearity Cancellation", filed Mar. 13, 2006, an U.S. patent application Ser. No. 11/725,528, titled "Selection of Filter Coefficients for Transceiver Non-linearity Signal Cancellation", filed Mar. 19, 2007, and are herein incorporated by reference.

FIELD OF THE INVENTION

The invention relates generally to network communications. More particularly, the invention relates to a method and apparatus for generating an estimated non-linear echo signal.

BACKGROUND OF THE INVENTION

High-speed networks are continually evolving. The evolution includes a continuing advancement in the operational speed of the networks. The network implementation of choice that has emerged is Ethernet networks physically connected over unshielded twisted pair wiring. Ethernet in its 10/100BASE-T form is one of the most prevalent high speed LANs (local area network) for providing connectivity between personal computers, workstations and servers.

High-speed LAN technologies include 100BASE-T (Fast Ethernet) and 1000BASE-T (Gigabit Ethernet). Fast Ethernet technology has provided a smooth evolution from 10 Megabits per second (Mbps) performance of 10BASE-T to the 100 Mbps performance of 100BASE-T. Gigabit Ethernet provides 1 Gigabit per second (Gbps) bandwidth with essentially the simplicity of Ethernet. There is a desire to increase operating performance of Ethernet to even greater data rates.

FIG. 1 shows a block diagram of a pair of Ethernet transceivers communicating over a bi-directional transmission channel, according to the prior art. An exemplary transmission channel includes four pairs of copper wire 112, 114, 116, 118. The transceiver pair can be referred to as link partners, and includes a first Ethernet port 100 and a second Ethernet port 105. Both of the Ethernet ports 100, 105 include four transmitter $T_X$, receiver $R_X$, and I/O buffering sections corresponding to each of the pairs of copper wires 112, 114, 116, 118.

An implementation of high speed Ethernet networks includes simultaneous, full bandwidth transmission, in both directions (termed full duplex), within a selected frequency band. When configured to transmit in full duplex mode, Ethernet line cards are generally required to have transmitter and receiver sections of an Ethernet transceiver connected to each other in a parallel configuration to allow both the transmitter and receiver sections to be connected to the same twisted wiring pair for each of four pairs.

One result of full duplex transmission is that the transmit signals shares the same transmission channel as the receive signals, and some of the transmit signal processing shares at least some electronic circuitry with receive processing. Non-linearities of transmit signals can be generated within the transmitter section of the transceiver, and at least some of the non-linearities can be imposed onto the receive signal. The result is distortion of the receive signal.

Full duplex transmission can result in at least a portion of the transmit signal being coupled back into the receive signal. The portion of the transmit signal that couples back is referred to as an echo signal. Linear portions of the echo signal can be canceled by subtracting an approximate echo signal from the received signal. Generation of the echo cancellation signal, and cancellation process can also introduce non-linearities which can be imposed on the receive signal. The result is additional distortion of the receive signal.

Additionally, the receive signal itself can introduce non-linearities. For example, the receiver section typically includes an ADC which converts the analog receive signal into a digital stream. This ADC can introduce receive signal non-linearity.

It is desirable to have an apparatus and method for reducing non-linearity of a receive signal due to a transmission signal of a full-duplex transceiver. It is additionally desirable to reduce non-linearity of the receive signal due to echo signal cancellation.

SUMMARY OF THE INVENTION

An embodiment includes a method of generating an estimated non-linear echo signal. The method includes receiving a plurality of data inputs. The plurality of data inputs are partitioned into subsets. A weight vector is computed for each of the subsets. A vector of addresses to memory locations is computed for each of the subsets. Values of interpolants are accessed at the memory locations (interpolation sites) based on the vector of addresses for each of the subsets. The estimated non-linear echo signal is calculated based on the values of the interpolants and the weight vector corresponding to each subset.

Another embodiment includes a method of generating a non-linear replica signal of a transmit DAC of a transceiver. The method includes receiving a plurality of data inputs to the transmit DAC. The plurality of data inputs are partitioned into subsets. A weight vector is computed for each of the subsets. A vector of addresses to memory locations is computed for each of the subsets. Values of interpolants are accessed at the memory locations (interpolation sites) based on the vector of addresses for each of the subsets. The estimated non-linear echo signal is calculated based on the values of the interpolants and the weight vector corresponding to each subset.

Other aspects and advantages of the present invention will become apparent from the following detailed description, taken in conjunction with the accompanying drawings, illustrating by way of example the principles of the invention.

BRIEF DESCRIPTION OF THE DRAWINGS

The present invention is readily understood by the following detailed description in conjunction with the accompanying drawings, wherein like reference numerals designate like structural elements, and in which.

DETAILED DESCRIPTION

Figure 1:
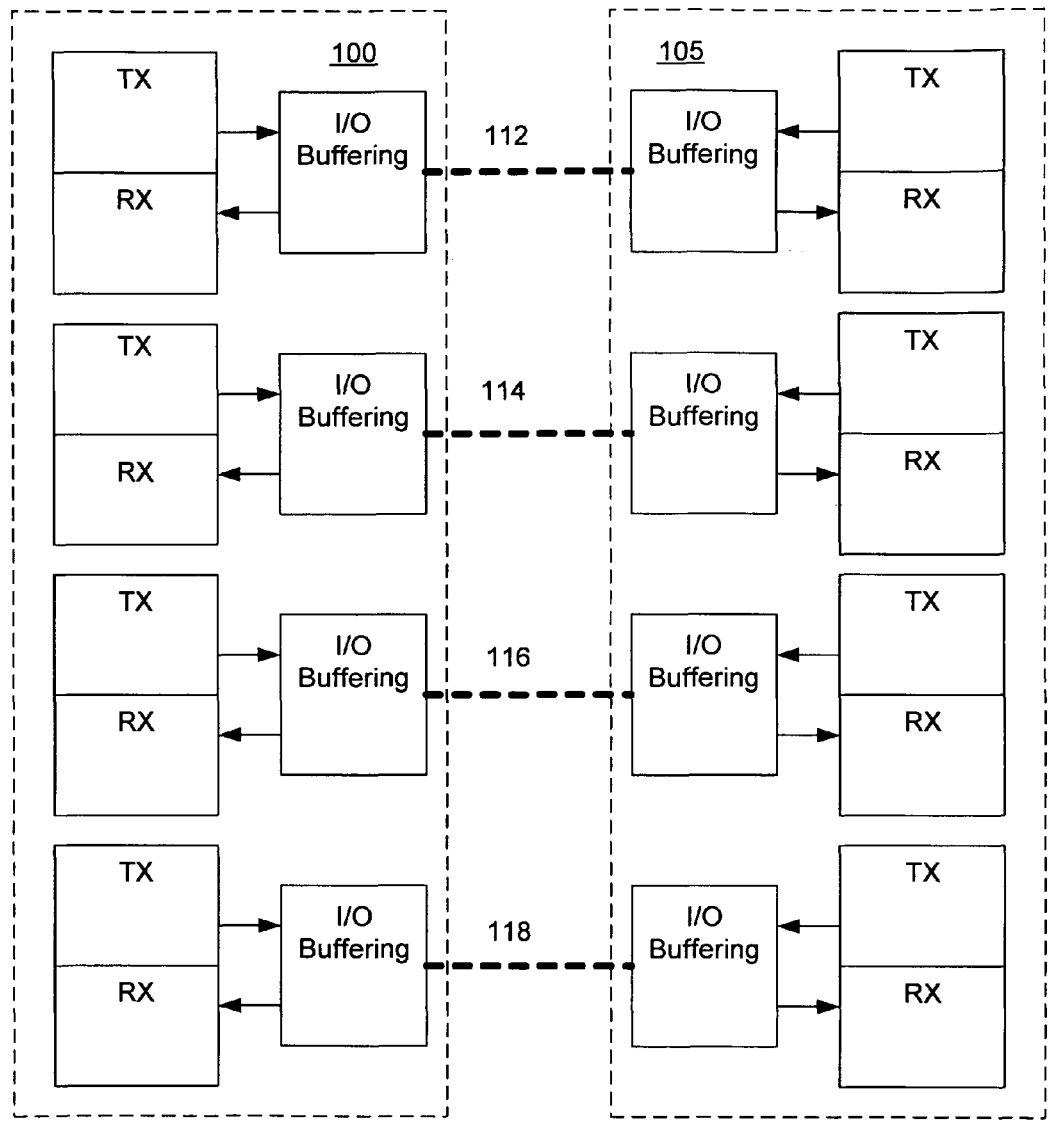
FIG. 1 shows a plurality of prior art Ethernet transceiver pairs.

As shown in the drawings for purposes of illustration, the invention is embodied in an apparatus and methods for generating an estimated non-linear echo signal. The estimated non-linear each signal can be summed within a transceiver with a received signal to mitigate non-linear signal coupled into a desired receive signal by the transceiver. One possible source of the non-linear signals is a transmit DAC and/or an echo signal DAC of the transceiver.

The descriptions provided are generally focused on Ethernet transceivers, but the embodiment can be used in other configurations of transceivers as well.

Figure 2:
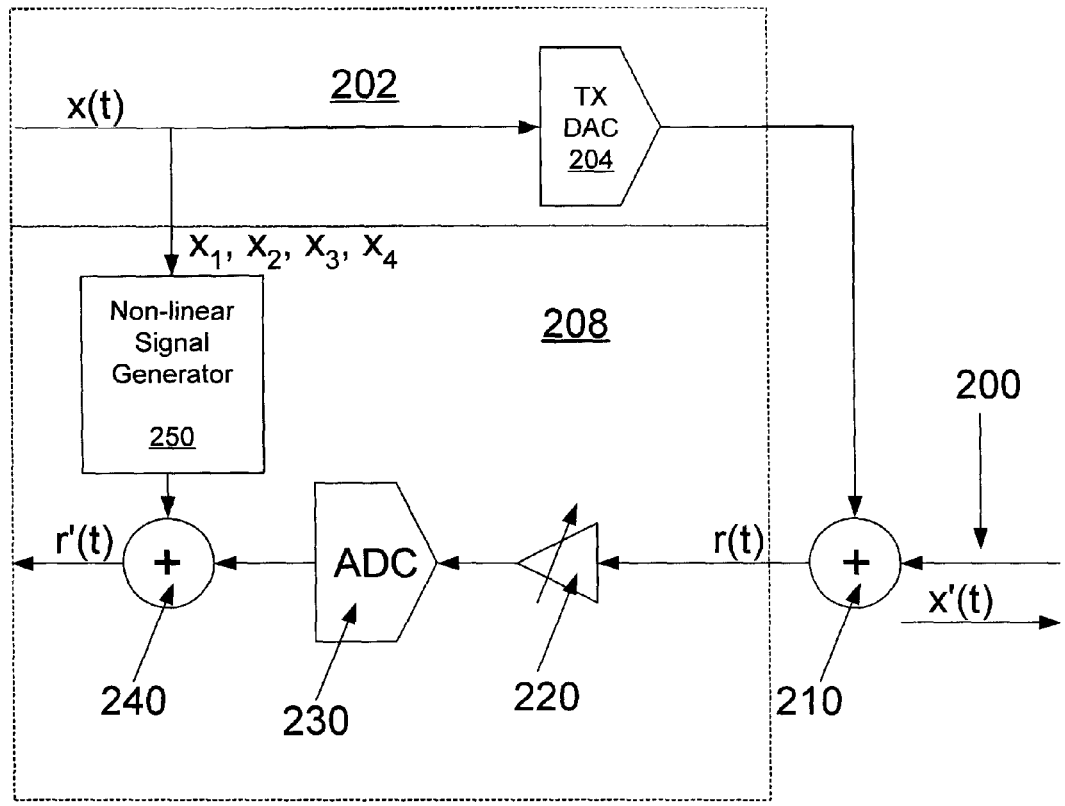
FIG. 2 shows a block diagram of one example of a transceiver that can utilizes methods of receive signal linearization.

FIG. 2 shows a block diagram of one example of a transceiver that can utilizes receive signal linearization. The transceiver includes a transmitter section 202 for transmitting a transmit signal x(t) and a receiver section 208 for receiving a receive signal r(t). A non-linear signal generator 250 receives the transmit signal x(t) (as will be described, an embodiment includes the non-linear signal generator receiving a continuous set of x1, x2, x3, x4 transmit signal data) and generates a non-linear replica signal of non-linear transmit signal components imposed onto receive signal in the transceiver. A summer 240 negatively sums (combines) the replica with the receive signal to cancel non-linear transmit signal component of the receive signal. The non-linear replica signal is an estimate of the non-linear transmit signal components imposed on the receive signal.

The receiver section 208 can additionally include an adjustable gain amplifier 220, and analog to digital converter (ADC) 230.

Another summer 210 shown in FIG. 2 shows the transmit signal and the receive signal being connected to a common transmission channel 200. At least a portion of the transceiver, and the transmission channel 200 are shared by both the transmitter section and receiver section of the transceiver. An embodiment can include a hybrid circuit within the transceiver in which the transmit and receive signals are summed.

The digital transmission signal x(t) is passed through a transmission DAC 204 before transmission through the transmission channel 200, generating an analog transmission signal x'(t). The digital to analog conversion can create non-linear signal components that can be imposed on the receive signal. These non-linearities reduce the performance of the transceiver.

The estimated non-linear replica signal generated by the non-linear signal generator 250 reduces the non-linear components imposed on the receive signal by negatively summing the estimated non-linear replica signal with the receive signal. The non-linear replica signal cancels the non-linear components imposed on the receive signal by, for example, the transmission DAC 204.

For this embodiment, the non-linear signal generator 250 receives a single input which can be the transmission signal x(t), more specifically, a set of data inputs (x1, x2, x3, x4), and generates the non-linear replica signal. As will be described, one embodiment of the non-linear signal generator 250 partitions the plurality of data inputs into subsets. A weight vector and a vector of addresses to memory are computed for each of the subsets. Values of interpolants are accessed from memory for each corresponding components of the vector of addresses. An estimated non-linear echo signal is calculated based on the values of the interpolants and the weight vector corresponding to each subset.

The values of the interpolants stored within the memory can be predetermined. The complexity of the memory, and the complexity of the calculation of the value of the estimated non-linear signal can be selected based on a trade-off analysis between complexity of the calculation and the accuracy of the calculated value. Essentially, the value of the estimated non-linear signal is calculated using a piece-wise linear approximation based on the values of the interpolants and the values of the components of the weight vectors. Embodiments of the non-linear signal generator 250 will be described.

Figure 3:
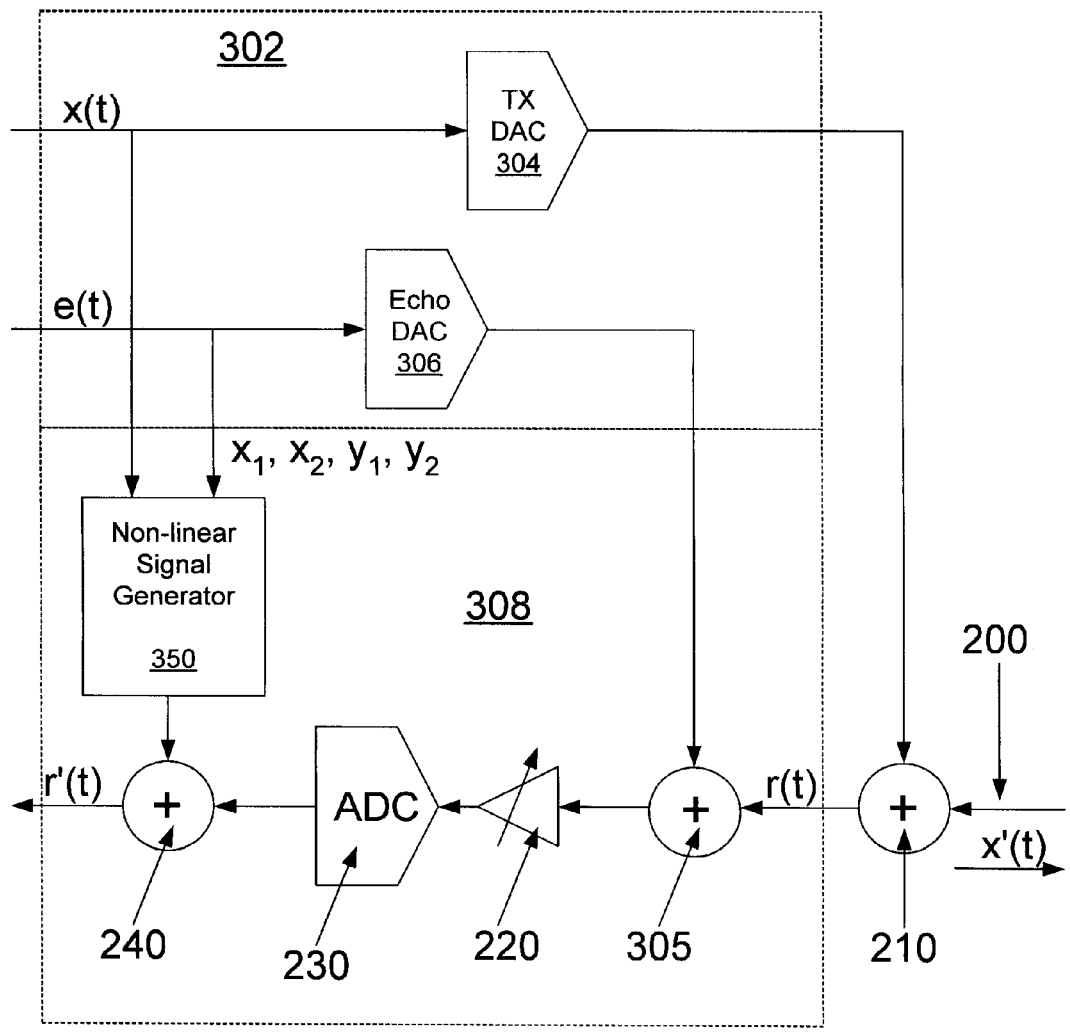
FIG. 3 shows a block diagram of another example of a transceiver that can utilized methods of receive signal linearization.

FIG. 3 shows a block diagram of another example of a transceiver that can utilize receive signal linearization. This transceiver additionally includes an echo signal canceller 305. The direct connection between the transmitter section and the receiver section typically causes at least a portion of transmitter signals to be additionally received by the receiver, resulting in an echo signal. An echo cancellation signal e(t) can be generated, for example, by filtering the transmission signal. The echo cancellation signal e(t) is summed with the receive signal to mitigate the effects of the echo signal. Alternatively, the echo cancellation signal e(t) is set to be the transmission signal x(t).

The echo cancellation signal can generate non-linearities as well. For example, an echo signal DAC 306 can generate non-linear signal components that can be imposed on the receive signal. A non-linear signal generator 350 receives the transmission signal x(t), more specifically, a first subset (x1, x2). For this embodiment, the non-linear signal generator also receives the echo signal e(t), more specifically, a second subset (y1, y2) generating the non-linear replica signal. The non-linear replica signal is combined with the receive signal, reducing the non-linearites of the receive signal as imposed by the transmit signal DAC non-linearities and the echo signal DAC non-linearities. FIG. 3 shows cancellation of non-linearities of both DACs. However, the transceiver can include only cancellation of transmit signal DAC non-linearites as shown in FIG. 2, or alternatively, the transceiver can also include cancellation of echo signal DAC non-linearities.

The circuitry within the non-linear signal generator 350 can be similar to the circuitry within the non-linear signal generator 250. The difference being in the selection of the data inputs of the different subset for estimation of the non-linear echo signal.

Figure 4:
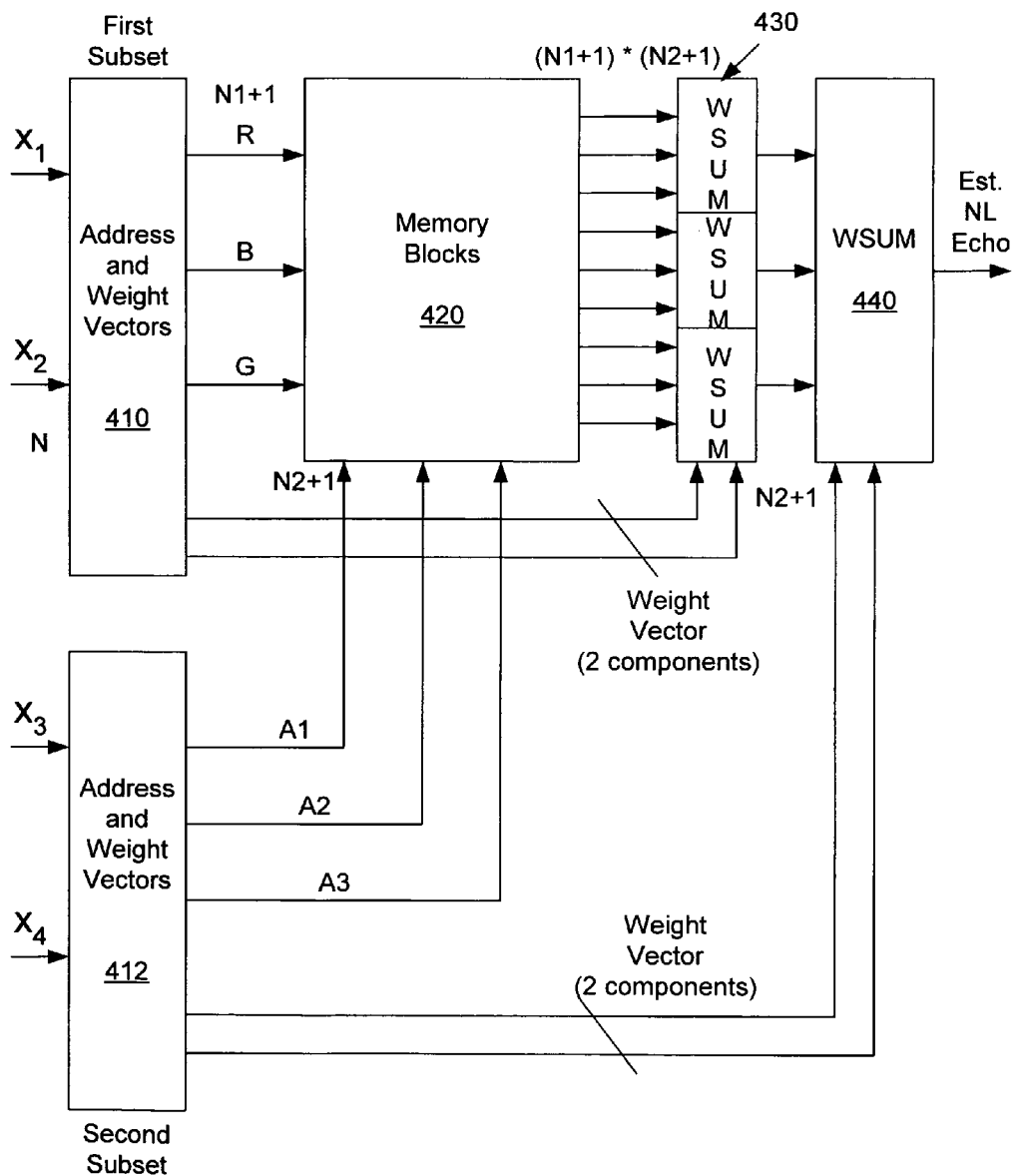
FIG. 4 shows an embodiment of a block diagram of a non-linear echo signal estimate generator.

FIG. 4 shows an embodiment of a block diagram of a non-linear echo signal estimate generator. The block diagram shown in FIG. 4 corresponds with the block diagram of the transceiver of FIG. 2 in that the non-linear echo signal estimate generator of FIG. 4 receives a running set of four inputs x1, x2, x3, x4. The block diagram includes memory 420 that includes memory blocks. The memory is addressed based, for example, on vectors of addresses computed from the data inputs x1, x2, x3, x4. The embodiments described here use two data inputs within two subsets. However, the number of subsets used and the number of data inputs within each subset can be adjusted for optimization of the estimation of the non-linear signals. Each of the data inputs can include any reasonable number of bits required for the desired resolution. Too many bits creates complexity, while too few bit provides poor performance.

As shown, a first address and weight vector generation block 410 generates a vector address that includes 3 components (labeled R, B and G) and a weight vector that includes two components based on a first subset of x1, x2 data input. The different components R, B, G of the vector of addresses can include a desired number of bits. For an embodiment, each of the different components address a different block of the memory, such as, an R block, a B block and a G block. Each block includes multiple words. The weight vector is used for piece-wise linear approximations of values of interpolants addressed by the vector addresses as will be described. For this embodiment, the weight vector includes 2 components.

A second weight and address generation block 412 also generates a vector address that includes 3 components (labeled A1, A2, A3 in FIG. 4). The components of the vector address can be used for further select values of interpolant within the words of the blocks selected by the vector address of the first subset.

Observation of the embodiment of FIG. 4 reveals that if the number of data inputs in each of the subsets is N1 (first subset), N2 (second subset), then the vectors of addresses include N1+1 components for the first subset and N2+1 components for the second subset, and the weight vectors include N1 components for the first subset and N2 components for the second subset. Furthermore, the memory 420 include N1+1 blocks and (N1+1)*(N2+1) values of interpolants that are accessed from the memory 420.

The weight vector generated by the address and weight vector block 410 of the first subset is connected to a piece-wise linear combiner 430. The combiner 430 compresses the ((N+1)*(N2+1)) values of interpolants into N2+1 values—a linear piece-wise approximation. The weight vector generated by the address and weight vector block 412 of the second subset is connected to a piece-wise linear combiner 440. The combiner 440 compresses the (N2+1) values of interpolants into 1 value (the estimated non-linear echo signal)—a linear piece-wise approximation. For an embodiment, N1=N2=2.

Figure 5:
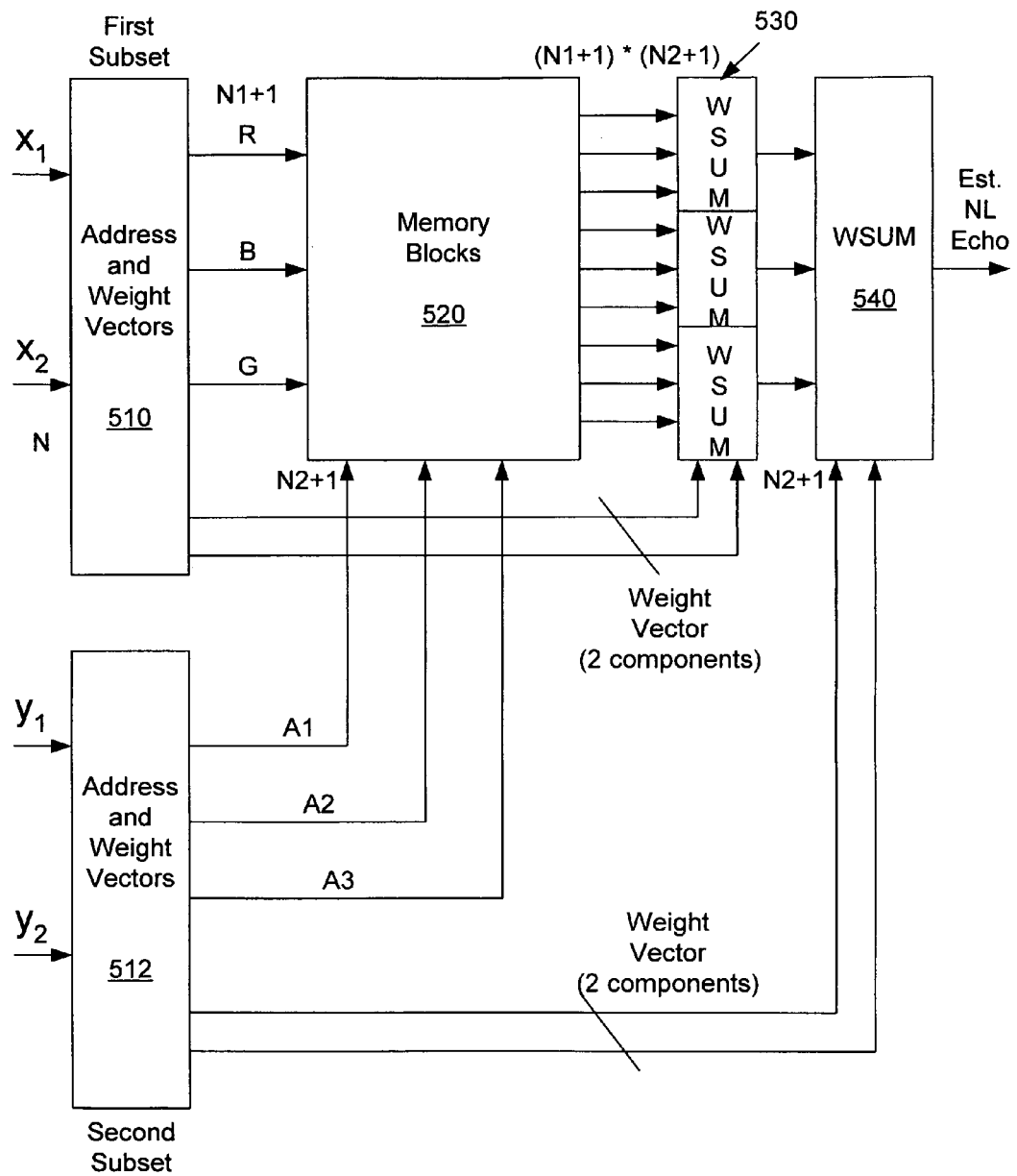
FIG. 5 another embodiment of a block diagram of a non-linear echo signal estimate generator.

FIG. 5 shows another embodiment of a block diagram of a non-linear echo signal estimate generator. The block diagram shown in FIG. 5 corresponds with the block diagram of the transceiver of FIG. 3 because the non-linear echo signal estimate generator of FIG. 4 receives a running set of four inputs x1, x2, y1, y2. The block diagram includes memory 520 that includes memory blocks. The memory is addressed based, for example, on addresses computed from the data inputs x1, x2, y1, y2. As shown, a first address and weight vector generation block 510 generates a vector address having 3 components and weight vector having 2 components based on the x1, x2 data inputs, and a second address and weight vector generation block 512 generates a vector address having 3 components and weight vector having 2 components based on the y1, y2 data inputs.

As shown, a first address and weight vector generation block 510 generates a vector address that includes 3 components (labeled R, B and G) and a weight vector that includes two components based on a first subset of x1, x2 data input. The different components R, B, G of the vector of addresses can include a desired number of bits. For an embodiment, each of the different components address a different block of the memory, such as, an R block, a B block and a G block. Each block includes multiple words. The weight vector is used for piece-wise linear approximations of values of interpolants addressed by the vector addresses as will be described. For this embodiment, the weight vector includes 2 components.

A second weight and address generation block 512 also generates a vector address that includes 3 components (labeled A1, A2, A3 in FIG. 5). The components of the vector address can be used for further select values of interpolant within the words of the blocks selected by the vector address of the first subset.

Observation of the embodiment of FIG. 5 reveals that if the number of data inputs to each of the subsets is N1 (first subset), N2 (second subset), then the vectors of addresses include N1+1 components for the first subset and N2+1 components for the second subset, and the weight vectors include N1 components for the first subset and N2 components for the second subset. Furthermore, the memory 520 include N1+1 blocks and (N1+1)*(N2+1) values of interpolants that are accessed from the memory 520.

The weight vector generated by the address and weight vector block 510 of the first subset is connected to a piece-wise linear combiner 530. The combiner 530 compresses the ((N1+1)*(N2+1)) values of interpolants into N2+1 values—a linear piece-wise approximation. The weight vector generated by the address and weight vector block 512 of the second subset is connected to a piece-wise linear combiner 540. The combiner 540 compresses the (N2+1) values of interpolants into 1 value (the estimated non-linear echo signal)—a linear piece-wise approximation. For and embodiment, N1=N2=2.

Figure 6:
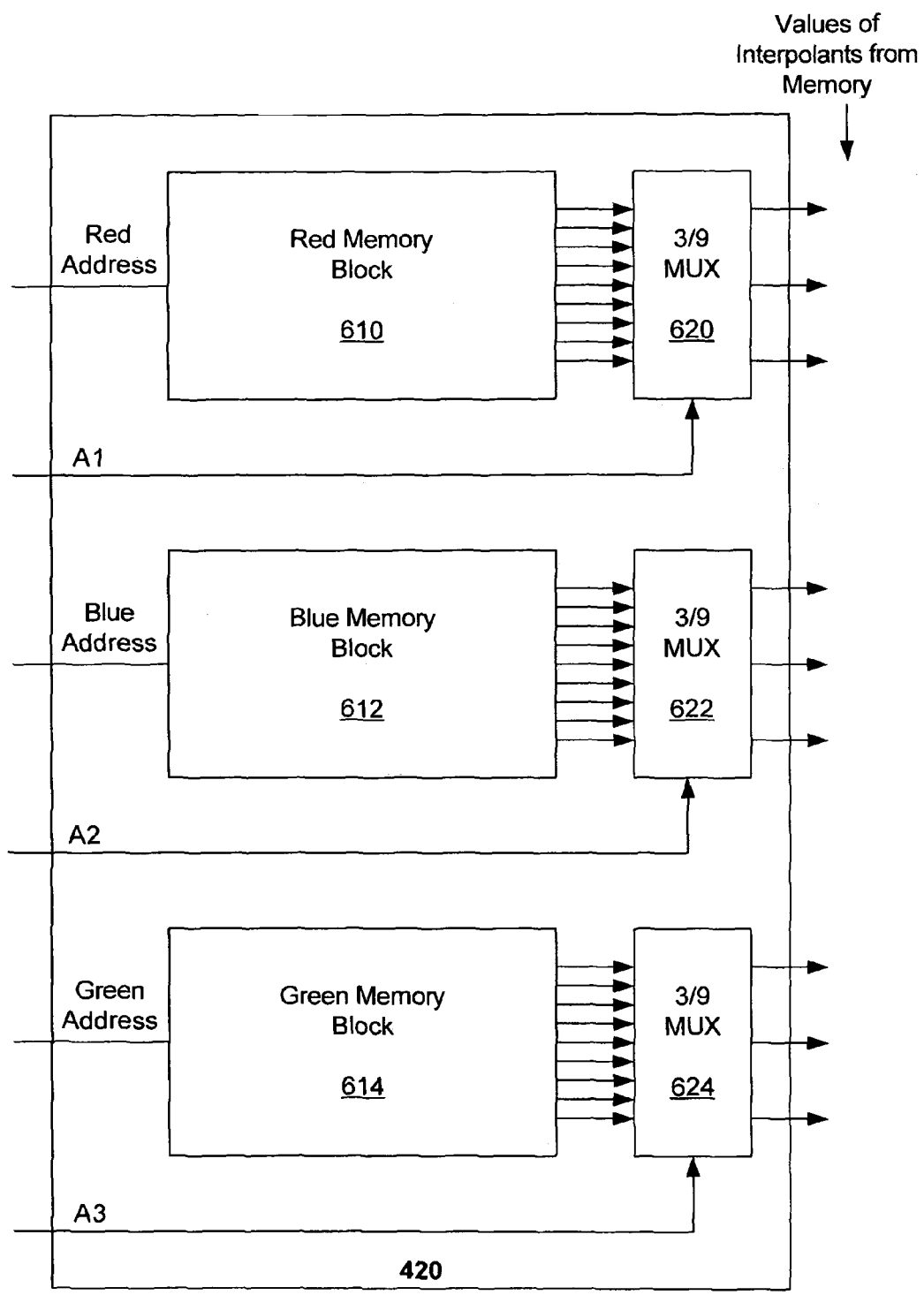
FIG. 6 shows a block diagram of one example of an embodiment of memory architecture of a non-linear echo signal estimate generator.

FIG. 6 shows a block diagram of one example of an embodiment of memory architecture of a non-linear echo signal estimate generator. The memory architecture of FIG. 6 can be used to implement the memory 420 or 520. As shown, the memory 420 includes three blocks 610, 612, 614 labeled Red, Blue, and Green. The vector address (R, B, G) of the first subset provides a selection of M2 values of interpolants from each of the corresponding blocks of memory. The M2 values of interpolants are each input into corresponding M2/(N2+1) multiplexers 620, 622, 624 and each multiplexer 620, 622, 624 has 3 outputs. The combined 9 values are the (N1+1)*(N2+1) values of interpolants output from the memory 420.

Figure 7:
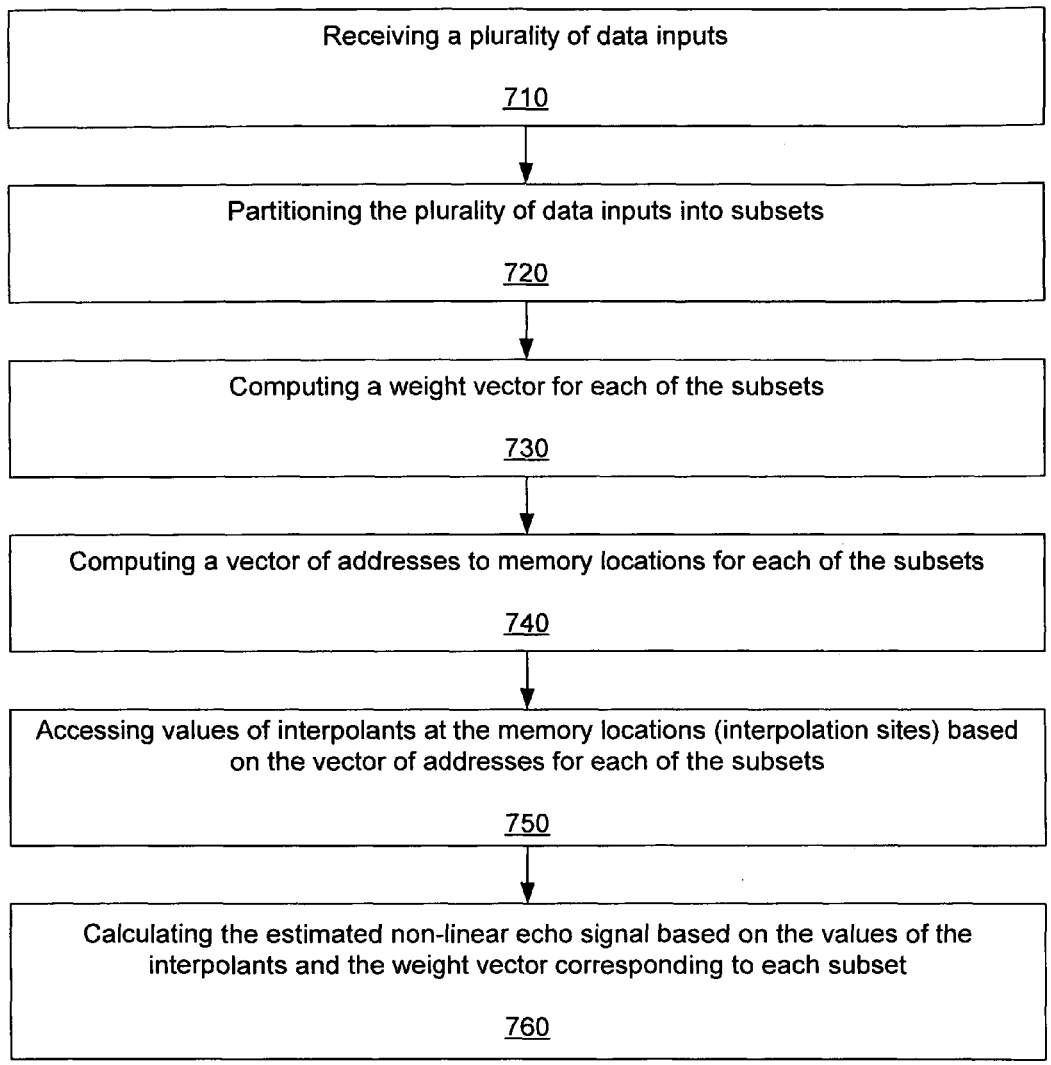
FIG. 7 is a flow chart that includes steps of one example of a method of generating an estimated non-linear echo signal.

FIG. 7 is a flow chart that includes steps of one example of a method of generating an estimated non-linear echo signal. A first step 710 includes receiving a plurality of data inputs. A second step 720 includes partitioning the plurality of data inputs into subsets. A third step 730 includes computing a weight vector for each of the subsets. A fourth step 740 includes computing a vector of addresses to memory locations for each of the subsets. A fifth step 750 includes accessing values of interpolants at the memory locations (interpolation sites) based on the vector of addresses for each of the subsets. A sixth step 760 includes calculating (generating) the estimated non-linear echo signal based on the values of the interpolants and the weight vector corresponding to each subset.

An embodiment includes each interpolant being a piece-wise linear function. Additionally, the plurality of data inputs is a continuous steam of data, and the partitioning of the data inputs into subset occurs continuously at a rate that each data input is received. Furthermore, the value for the estimated non-linear echo signal is calculated once per received data input.

An embodiment includes the subset each including $N_i$ data inputs. However, as described, the number of data inputs in the different subsets can vary. For an embodiment, each subset comprises $M_i$ interpolant sites (as previously stated, values of interpolants at interpolation sites are stored at the memory locations), and $M_i$ is dependent upon a degree of dependency of a non-linear echo signal being estimated on a number of data inputs.

If each subset includes $N_i$ data inputs, an embodiment includes the vector of addresses for each subset including $N_i+1$ components. Furthermore, the memory is partitioned into $N_i+1$ blocks, a block corresponding with each component of the vector of addresses of a subset (for example, the first subset). Additionally, this embodiment includes the weight vectors each including $N_i$ components. Each interpolation value is stored in one and only one memory block, and for each plurality of input data only one access to memory is required.

Interpolation sites can be calculated for each subset, and the memory partitioned into $M_1$ interpolation sites for each subset. Additionally, each of N1+1 blocks of the memory includes $(M_1)/(N1+1)$ words. Each of the words can be partitioned into $M_2$ subwords.

For another embodiment a first subset includes N1 data inputs and a second subset includes N2 data inputs. For this embodiment, a value for the estimated non-linear echo signal is calculated based on the values of the interpolants and the weight vector corresponding to each subset. N2+1 piece-wise linear approximations are generated from (N1+1)*(N2+1) values of interpolants from memory using N1 components of a weight vector corresponding to the first subset. The value for the estimated non-linear each signal is generated by piece-wise approximating the N2+1 piece-wise linear approximations using N2 components of a weight vector corresponding to a second subset. One embodiment includes N1 being equal to N2. One specific embodiment includes N1=N2=2. It should be noted that the piece-wise approximations of the first subset and the second subset can be interchanged.

An embodiment of computing a vector address for each subset includes determining $N_i+1$ closest interpolation sites for each subset. For a first subset, a unique linear address is computed that identifies a memory block and address of words including values of interpolants at the memory locations. For a second subset, a unique address of values of interpolants within each word in the memory block is computed.

An embodiment of computing a weight vector for each subset includes computing $N_i+1$ interpolation sites for each subset. One of the interpolation sites is selected as an origin, and the other of the interpolation sites are designated as terminal sites. $N_i$ displacement vectors are computed, wherein the displacement vectors are defined by the origin and the terminal sites. A subset representing vector is computed, wherein the subset representing vector is identified by the origin and a point that represents the subset. Coefficients of a linear expansion of the subset representing vector are computed based on the $N_i$ displacement vector. The weight vector is computed based on the coefficients of the linear expansion. This embodiment and the associated terms are additionally described by the mathematical discussion.

Figure 8:
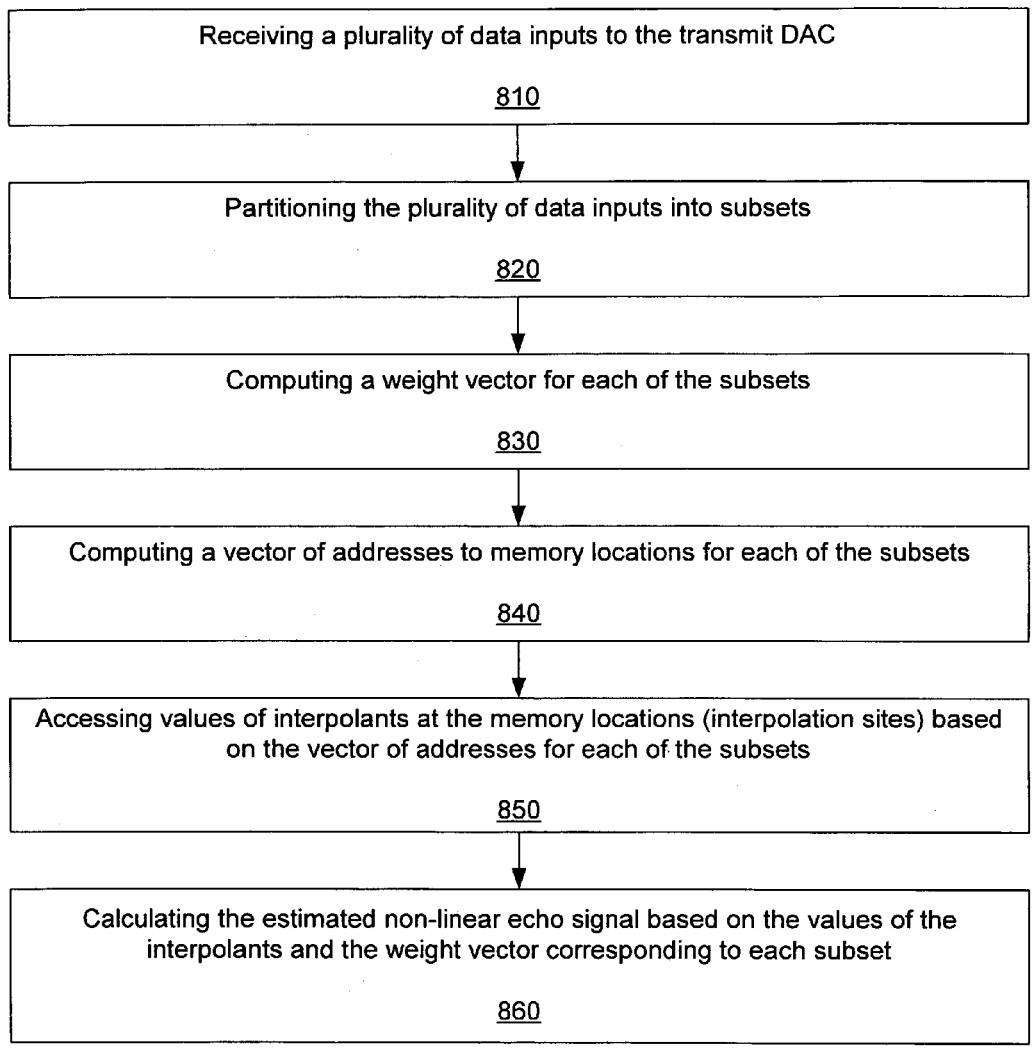
FIG. 8 an example of one method of generating a non-linear replica signal of a transmit DAC of a transceiver.

FIG. 8 an example of one method of generating a non-linear replica signal of a transmit DAC of a transceiver. A first step 810 includes receiving a plurality of data inputs to the transmit DAC. A second step 820 includes partitioning the plurality of data inputs into subsets. A third step 830 includes computing a weight vector for each of the subsets. A fourth step 840 includes computing a vector of addresses to memory locations for each of the subsets. A fifth step 850 includes accessing values of interpolants at the memory locations (interpolation sites) based on the vector of addresses for each of the subsets. A sixth step 860 includes calculating (generating) the estimated non-linear echo signal based on the values of the interpolants and the weight vector corresponding to each subset.

For an embodiment, the data inputs further include echo DAC data inputs of an echo DAC of the transceiver. More specifically, a first subset includes transmit DAC data inputs and a second subset includes echo DAC data inputs. For another embodiment, the first subset includes transmit DAC data inputs and the second subset includes ADC data outputs of a receive ADC of the transceiver.

For a mathematical representation of one method of estimating a non-linear echo signal according to the described embodiments (more specifically, calculation of the vector address and weight vector are provide by example), the non-linear echo signal estimate can be represented by:

$$z = f(x1, x2, x3, x4).$$

Assuming that the data inputs x1, x2 are constants, the address vector and weight vector of, for example, the second weight and address generation block 412 of FIG. 4 can be analyzed, and the non-linear echo signal estimate can be represented by:

$$z = f_{x1,x2}(x3, x4).$$

Figure 9:
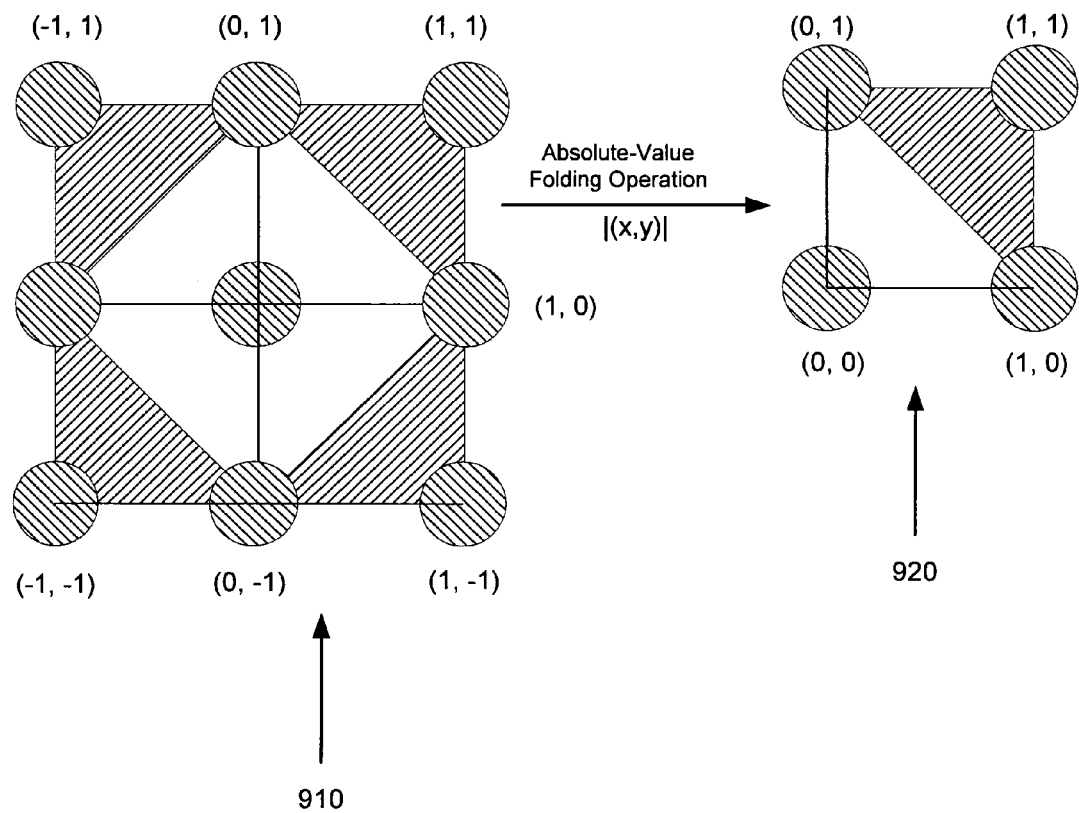
FIG. 9 shows a set of interpolation sites depicted as a unit square that includes several regions.

A goal of the estimation is to realize a piece-wise approximation to $f_{x1,x2}$, which can be designated as $\Phi_{x1,x2}$. FIG. 9 shows a set of interpolation sites depicted as a unit square 910 that includes several regions. The points of FIG. 9, such as (−1, 1), (0, 1), (1, 1) ect., represent interpolation sites, for example, P0, P1, P2. Defining $D_{P0}(P1) = \Phi_{x1,x2}(P1) - \Phi_{x1,x2}(P0)$. The dependence of D on x1, x2 is implicit. Further, defining P0=(0, 1), P1=(1,0), P2=(0, 1), and defining P0 as the origin, P1, P2 as terminal sites, P0P1, P0P2 as displacement vectors, x=(x3, x4) as a point, and x=x−P0 as a subset representing vector. Assuming that x2>=0, x3>=0, and x2+x3<=1, then:

$$\Phi_{x1,x2}(x3, x4) = \Phi_{x1,x2}(0,0) + x3 D_{0,0}(1,0) + x4 D_{0,0}(0,1),$$

which follows from the fact that $\Phi$ is piecewise linear, and the relationship $$x = P0 + x3 \underline{P0P1} + x4 \underline{P0P2}.$$

These results can be extended to other regions of the unit square 910 of FIG. 9 as depicted by the absolute-value folding operation shown in FIG. 9. Generally:

$$\Phi_{x1,x2}(x3, x4) = \Phi_{x1,x2}(P0) + \mu D_{P0}(P1) + \gamma D_{P1}(P2).$$

If $|x3|+|x4|<=1$, then:
P0=(0,0),
P1=(sign(x3), 0) and $\mu=|x3|$,
P2=(0, sign(x4)) and $\gamma=|x4|$.
If $|x3|+|x4|>1$, then:
P0=(sign(x3), sign(x4)),
P1=(sign(x3), 0) and $\gamma=1-|x3|$,
P2=(0, sign(x4)) and $\mu=1-|x4|$.

The vector $(\mu, \gamma)$ is, for example, the weight vectors as shown in FIG. 4. Assuming the interpolation point $P_i$ has the coordinates $(k_i, l_i)$, and $k_i, l_i$ are from the set $\{-1, 0, 1\}$. The address $A_i$ (i=1, 2, 3) as shown, for example, in FIG. 4 can be computed using the equation:

$$A_i = 3 \times l_i + k_i + 4.$$

The equilateral triangle lattice 920 can be used to form a continuous piecewise linear approximation $\psi(x1, x2)$ for generation, for example, the addresses and the weights of the first address and weight vector generation block 410. The continuous linear approximation $\psi(x1, x2)$ is a linear approximation of the function f(x1, x2) while x3, x4 are held constant.

The interpolation sites can be represented in which no two neighboring nodes are depicted the same way. The memory is partitioned into three pieces, and there are no memory conflicts. The triangular lattice 920 is defined as x=mp+nq, where p=(d,0) and q=d(½, √3/2), and d=(2/(13√3)) for interpolation over [0,1]².

The piecewise linear interpolation for the (x1, x2) plane can be provide. First, for a given x=(x1, x2), a unit parallelogram that contains x is identified. Next, a transformation is applied, such as:

$$\begin{bmatrix} r0 \\ r1 \end{bmatrix} = (1/d) \begin{bmatrix} 1 & -(1/\sqrt{3}) \\ 0 & 2/\sqrt{3} \end{bmatrix} \begin{bmatrix} x1 \\ x2 \end{bmatrix}$$

P0==mp+nq can be identified on the lower left corner of the unit parallelogram, and:
- −n=⌊r1⌋,
- −m=⌊r0⌋.

Defining $\bar{x}$=x−P0 (subset representing vector), and finding the linear expansion $\bar{x}$=μp+γq, where 0<=μ, γ<=1, and γ=r1−n, μ=r0−m.

If μ+γ<=1, then P0 is the lower left corner of the minimal triangle encompassing x, and ψ(x1, x2)=ψ(P0)+μD$_{P0}$(P1)+γD$_{P0}$(P2), where P1=P0+p, P2=P0+q, and D$_{P0}$(P1)=ψ(P1)−ψ(P0).

If μ+γ>1, then P0→P0+p+q, P1=P0−p, P2=P0−q, μ→1−μ, γ→1−γ, and ψ(x1, x2)=ψ(P0)+μD$_{P0}$(P1)+γD$_{P0}$(P2).

Figure 10:
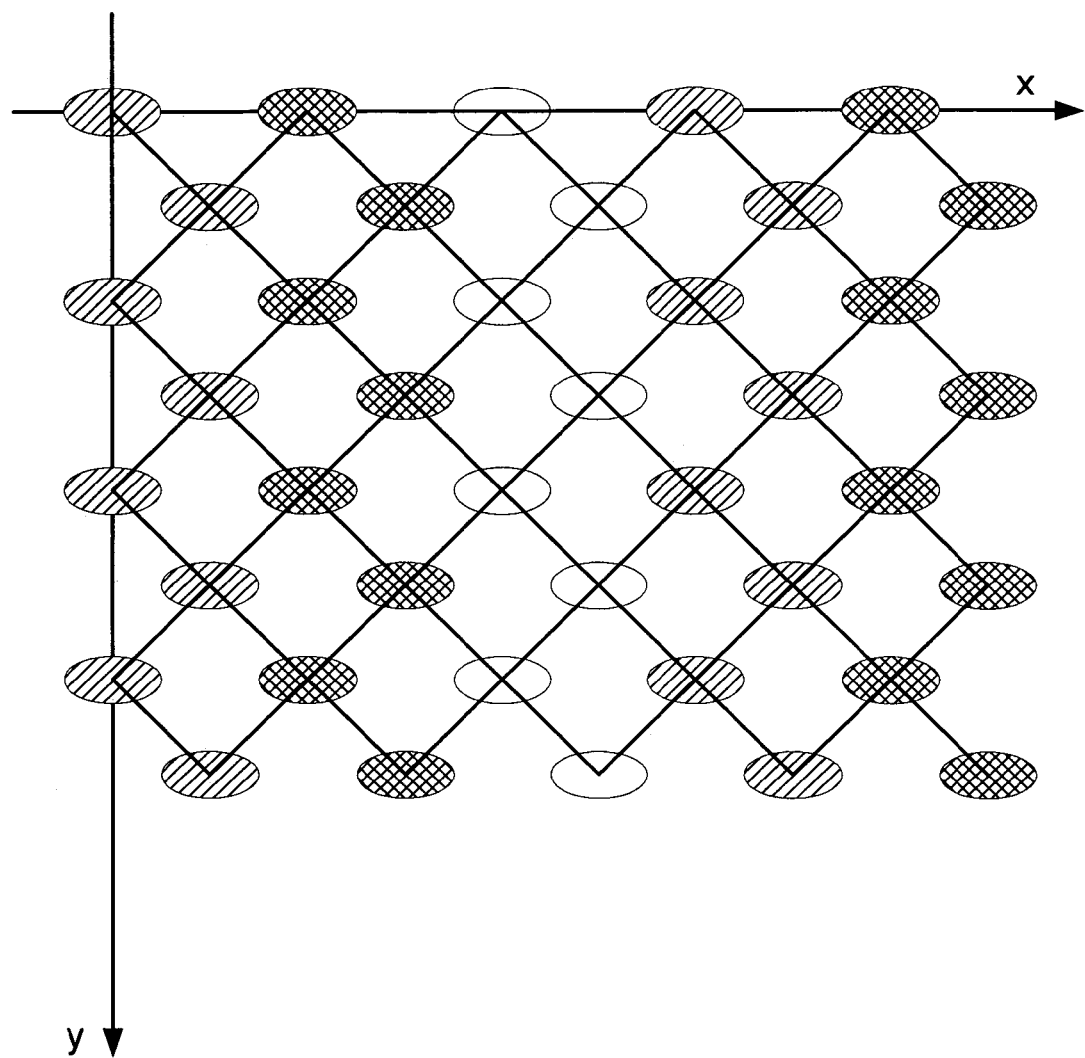
FIG. 10 shows a representation of many interpolation sites.

The vector (μ,γ) is a two-component vector, such as, the weight vectors of FIG. 4. The three addresses R, G, B of FIG. 4 can be resolved. More specifically, the {addr (P0), addr(P1), addr(P2)} can be computed based on known {P0, P1, P2}. These interpolation sites are neighbors, and are distinguishably represented, for example, in FIG. 10. FIG. 10 shows a representation of many interpolation sites. For each point of the triangular lattice 920, a memory block that contains ψ (P$_i$) must be identified, and the address in the memory block in which ψ (P$_i$) resides.

First a linear address for all points (interpolation sites) of FIG. 10 is defined. The linear address of an interpolation sited P=mp+nq can be defined as:
N(m, n)=(M+1)n+m, where M is the maximum value the m can take.

One embodiment includes selecting M such that the remainder of M in division by 3 is 2. This embodiment can be advantageous because it provides that no two neighboring nodes are depicted the same way, which allows the memory to be partitioned into 3 blocks, and each block is accessed only once per each subset. This address is obtained by linearizing the lattice points along their rows. The order of the distinguishably represented points (interpolation sites) is uniformly invariant, and corresponds with the Red, Blue, Green designators. To determine the address of each interpolation site requires computation of ⌊1/3N(m,n)⌋, which requires exact division of a number by 3.

The previously discussed interpolation values can be experimentally determined, and stored in the interpolation sites. For example, test patterns of data can be applied to the transceiver, and the resulting non-linearities observed. Based on comparisons of the resulting non-linearities with the known test patterns, interpolation values can be estimated.

A Network of Devices

Figure 11:
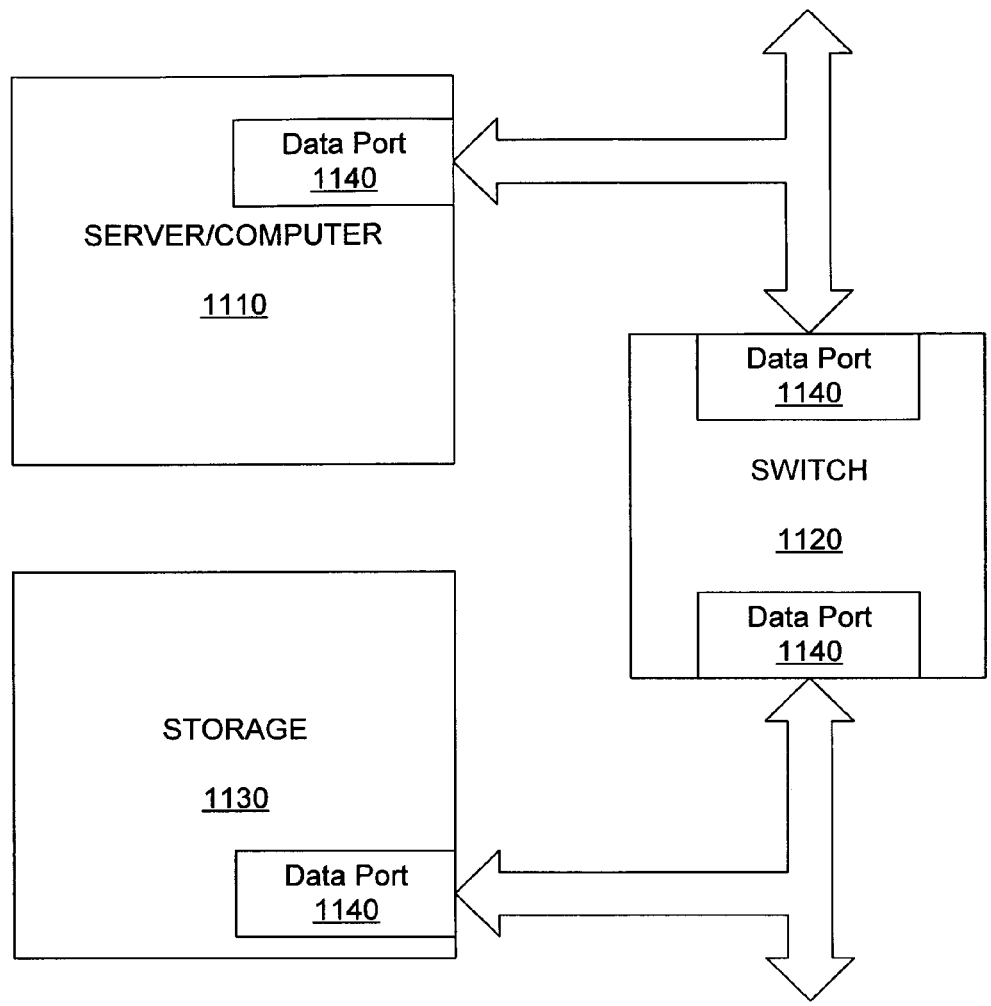
FIG. 11 shows devices connected to an Ethernet network that can include embodiments of the receive signal linearization.

FIG. 11 shows devices connected to an Ethernet network that can include embodiments of the transceiver linearizing. The network includes a server/computer 1110, a switch 1120 and storage 1130 that can all benefit from the use of a linearized transceiver 1140. The server/computer 1110 can be connected to the switch 1120 through an Ethernet twisted pair LAN connection. The switch 1120 can additionally be connected to the storage 1130 through an Ethernet twisted pair LAN connection. The linearized transceivers 1140 within the server/computer 1110, the switch 1120, and the storage 1130 can provide reduction of non-linear signal components of receive signals.

Although specific embodiments of the invention have been described and illustrated, the invention is not to be limited to the specific forms or arrangements of parts so described and illustrated. The invention is limited only by the appended claims.

What is claimed:

1. A method of generating an estimated non-linear echo signal of a transceiver, comprising:
    the transceiver simultaneously transmitting a transmit signal, and receiving a receive signal;
    receiving a plurality of data inputs of the transmit signal;
    partitioning the plurality of data inputs into subsets;
    computing a weight vector for each of the subsets;
    computing a vector of addresses to memory locations for each of the subsets;
    accessing values of interpolants at the memory locations based on the vector of addresses for each of the subsets;
    calculating the estimated non-linear echo signal based on the values of the interpolants and the weight vector corresponding to each subset;
    combining the estimated non-linear echo signal with the received signal.

2. The method of claim 1, wherein each interpolant is a piece-wise linear function.

3. The method of claim 1, wherein the plurality of data inputs is a continuous steam of data, and the partitioning of the data inputs into subset occurs continuously at a rate that each data input is received.

4. The method of claim 1, wherein each subset comprises N$_i$ data inputs.

5. The method of claim 1, wherein each subset comprises M$_i$ interpolant sites, and M$_i$ is dependent upon a degree of dependency of a non-linear echo signal being estimated on a number of data inputs.

6. The method of claim 4, wherein the vector of addresses for each subset comprises N$_i$+1 components.

7. The method of claim 6, wherein the memory is partitioned into N$_i$+1 blocks, a block corresponding with each component of the vector of addresses of a subset.

8. The method of claim 4, wherein the weight vectors comprises N$_i$ components.

9. The method of claim 3, wherein the value for the estimated non-linear echo signal is calculated once per received data input.

10. The method of claim 4, further comprising determining an interpolation site for each subset, and further comprising partitioning the memory into M$_1$ interpolation sites for each subset, and each of N+1 blocks of the memory comprises (M$_1$)/(N1+1) words.

11. The method of claim 10, wherein each of the words are partitioned into M$_2$ subwords.

12. The method of claim 1, wherein a first subset comprises N1 data inputs and a second subset comprises N2 data inputs, and wherein calculating a value for the estimated non-linear echo signal based on the values of the interpolants and the weight vector corresponding to each subset comprises:
    generating N2+1 piece-wise linear approximations from (N1+1)*(N2+1) values of interpolants from memory using N1 components of a weight vector corresponding to the first subset;

generating the value for the estimated non-linear each signal by piece-wise approximating the N2+1 piece-wise linear approximations using N2 components of a weight vector corresponding to a second subset.

13. The method of claim 12, wherein N1=N2.

14. The method of claim 1, wherein computing a vector address for each subset comprises:
   determining $N_i+1$ closest interpolation sites for each subset;
   for a first subset, computing a unique linear address that identifies a memory block and address of words comprising values of interpolants at the memory locations;
   for a second subset, computing a unique address of values of interpolants within each word in the memory block.

15. The method of claim 1, wherein computing a weight vector for each subset comprises:
   for each subset, computing $N_i+1$ interpolation sites;
   selecting one of the interpolation sites as an origin, and designating other of the interpolation sites as terminal sites;
   computing $N_i$ displacement vectors, wherein the displacement vectors are defined by the origin and the terminal sites;
   computing a subset representing vector, wherein the subset representing vector is identified by the origin and a point that represents the subset, computing coefficients of a linear expansion of the subset representing vector based on the $N_i$ displacement vectors;
   computing the weight vector based on the coefficients of the linear expansion.

16. A method of generating a non-linear replica signal of a transmit DAC of a transceiver, comprising:
   the transceiver simultaneously transmitting a transmit signal, and receiving a receive signal;
   receiving a plurality of data inputs to the transmit DAC, wherein the transmit DAC generates the transmit signal;
   partitioning the plurality of data inputs into subsets;
   computing a weight vector for each of the subsets;
   computing a vector of addresses to memory locations for each of the subsets;
   accessing values of interpolants at the memory locations based on the vector of addresses for each of the subsets;
   calculating the estimated non-linear echo signal based on the values of the interpolants and the weight vector corresponding to each subset;
   combining the estimated non-linear echo signal with the received signal.

17. The method of claim 16, wherein the data inputs further comprise echo DAC data inputs of an echo DAC of the transceiver.

18. The method of claim 17, wherein a first subset comprises transmit DAC data inputs and a second subset comprises echo DAC data inputs.

19. The method of claim 17, wherein a first subset comprises transmit DAC data inputs and a second subset comprises ADC data outputs of a receive ADC of the transceiver.

20. The method of claim 16, further comprising summing the value of the estimated non-linear echo signal with an output of a receive ADC of the transceiver.

* * * * *